(12) United States Patent
Atkinson et al.

(10) Patent No.: US 7,603,717 B2
(45) Date of Patent: *Oct. 13, 2009

(54) DIGITAL LICENSES THAT INCLUDE UNIVERSALLY QUANTIFIED VARIABLES

(75) Inventors: Bob Atkinson, Woodinville, WA (US); Brian A. LaMacchia, Seattle, WA (US); John DeTreville, Seattle, WA (US); Muthukrishnan Paramasivam, Seattle, WA (US); Xin Wang, Torrance, CA (US); Thomas DeMartini, Culver City, CA (US)

(73) Assignee: Microsoft Corporation, Redmond, WA (US)

( * ) Notice: Subject to any disclaimer, the term of this patent is extended or adjusted under 35 U.S.C. 154(b) by 670 days.

This patent is subject to a terminal disclaimer.

(21) Appl. No.: 10/298,872

(22) Filed: Nov. 18, 2002

(65) Prior Publication Data

US 2004/0098492 A1     May 20, 2004

(51) Int. Cl.
*G06F 17/30* (2006.01)
*G06F 15/16* (2006.01)

(52) U.S. Cl. .................... 726/26; 709/229
(58) Field of Classification Search ............ 713/155, 713/164, 188; 705/51; 709/229; 726/26
See application file for complete search history.

(56) References Cited

U.S. PATENT DOCUMENTS

| 5,530,235 | A | | 6/1996 | Stefik et al. |
| 5,629,980 | A | | 5/1997 | Stefik et al. |
| 5,634,012 | A | * | 5/1997 | Stefik et al. ............... 705/39 |
| 5,638,443 | A | * | 6/1997 | Stefik et al. ............... 705/54 |
| 5,715,403 | A | * | 2/1998 | Stefik ......................... 705/44 |
| 5,790,664 | A | | 8/1998 | Coley et al. |
| 6,056,786 | A | | 5/2000 | Rivera et al. |
| 6,233,684 | B1 | * | 5/2001 | Stefik et al. ............... 713/176 |
| 6,236,971 | B1 | * | 5/2001 | Stefik et al. ................. 705/1 |
| 6,253,193 | B1 | | 6/2001 | Ginter et al. |
| 6,708,157 | B2 | * | 3/2004 | Stefik et al. ............... 705/59 |
| 6,714,921 | B2 | * | 3/2004 | Stefik et al. ............... 705/55 |
| 6,754,642 | B2 | * | 6/2004 | Tadayon et al. ........... 705/51 |
| 6,816,842 | B1 | * | 11/2004 | Singh et al. ............... 705/59 |
| 6,920,436 | B2 | * | 7/2005 | Stefik et al. ............... 705/51 |
| 6,925,448 | B2 | * | 8/2005 | Stefik et al. ............... 705/51 |
| 7,028,009 | B2 | * | 4/2006 | Wang et al. ............... 705/51 |
| 7,083,095 | B2 | * | 8/2006 | Hendrick ................... 235/451 |
| 7,085,741 | B2 | * | 8/2006 | Lao et al. ................... 705/51 |
| 7,093,130 | B1 | * | 8/2006 | Kobayashi et al. ........ 713/176 |
| 7,096,202 | B2 | * | 8/2006 | Stefik et al. ............... 705/55 |
| 7,225,160 | B2 | * | 5/2007 | Stefik et al. ............... 705/51 |
| 7,269,577 | B2 | * | 9/2007 | Stefik et al. ............... 705/59 |

(Continued)

OTHER PUBLICATIONS

XrML—extensible rights Markup Language, Xing Wang et al.*

(Continued)

*Primary Examiner*—John Follansbee
*Assistant Examiner*—Kamal Divecha
(74) *Attorney, Agent, or Firm*—Workman Nydegger

(57) ABSTRACT

A computer-implemented mechanism for granting rights to a resource is described. A license identifies one or more principals, resources, rights and conditions in fields of the license. The license fields include one or more instances of one or more variables. The variables are universally quantified so that each variable may be any one of a set of values. All instances of any given variable are bound to the same value.

7 Claims, 5 Drawing Sheets

U.S. PATENT DOCUMENTS

| | | | |
|---|---|---|---|
| 7,308,717 B2 * | 12/2007 | Koved et al. | 726/27 |
| 2002/0120579 A1 * | 8/2002 | Kawaguchi et al. | 705/59 |
| 2002/0120841 A1 * | 8/2002 | Yellepeddy et al. | 713/156 |
| 2003/0061165 A1 * | 3/2003 | Okamoto et al. | 705/52 |
| 2003/0069803 A1 * | 4/2003 | Pollitt | 705/26 |
| 2003/0084306 A1 * | 5/2003 | Abburi et al. | 713/188 |
| 2004/0024688 A1 * | 2/2004 | Bi et al. | 705/37 |
| 2004/0059929 A1 * | 3/2004 | Rodgers et al. | 713/193 |
| 2004/0230797 A1 * | 11/2004 | Ofek et al. | 713/168 |

OTHER PUBLICATIONS

XrML 2.0 Technical Overview, Version 1.0, Mar. 8, 2002, pp. 1-24.*

The Digital Property Rights Language, Manual and Tutorial—XML Edition, Version 2.0, Nov. 13, 1998, pp. 1-99.*

XrML—A short History of Usage Rights, Karen Coyle, posted Jun. 2, 2004.*

Bonczek, et al., "A Transformational Grammar-Based Query Processor for Access Control in a Planning System", ACM Transactions on Database Systems, vol. 2, No. 4, Dec. 1977, pp. 326-338 (13 pgs).

* cited by examiner

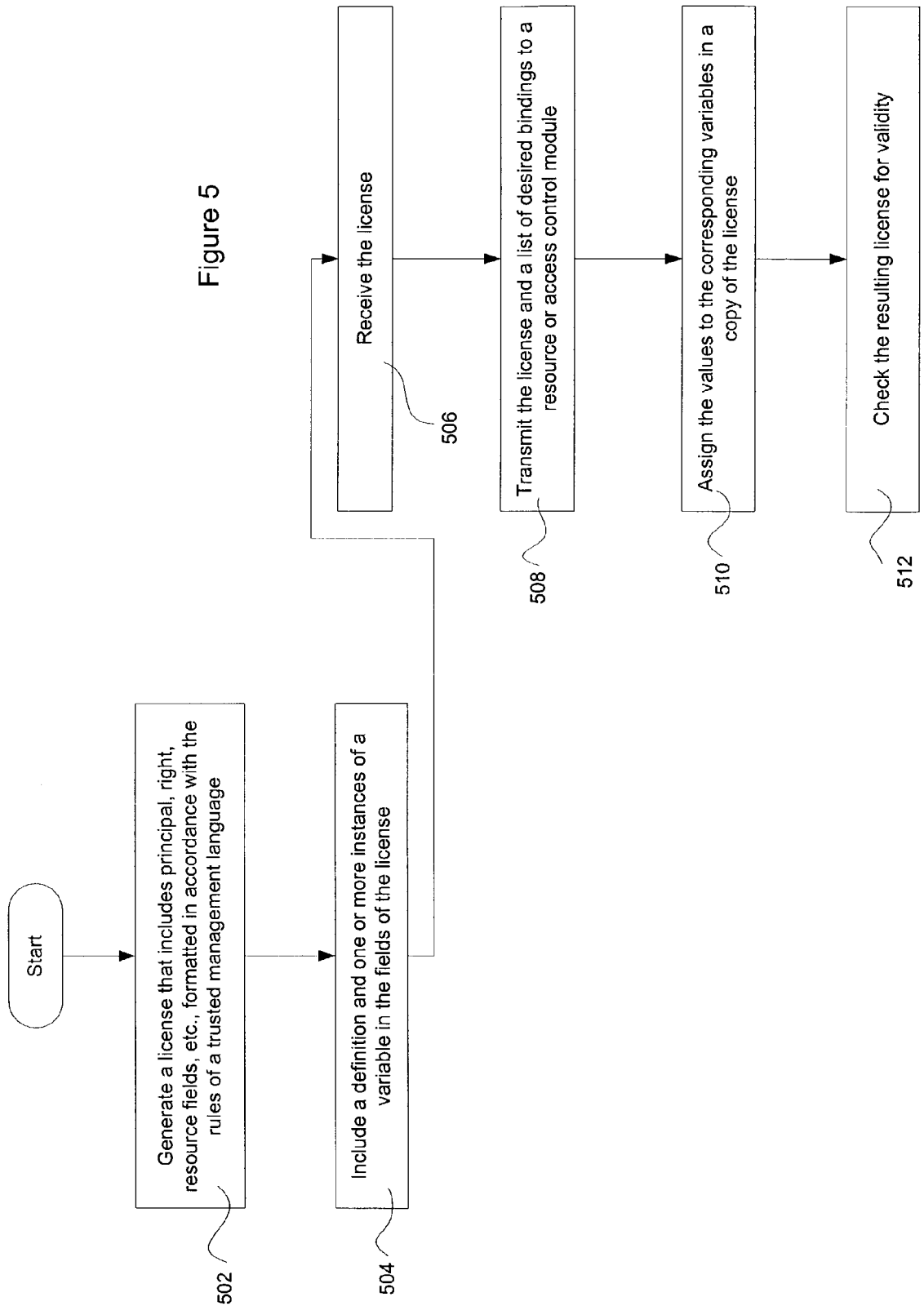

DIGITAL LICENSES THAT INCLUDE UNIVERSALLY QUANTIFIED VARIABLES

FIELD OF THE INVENTION

The invention generally relates to the field of computer security and, more particularly, to digital licenses and related trust-management systems and methods that can include variables.

BACKGROUND

Trust management languages and data structures are frequently used to grant principals, such as users, rights to access digital data. Conventional trust management languages and data structures are used to represent licenses. A license typically identifies the issuer, the principal, the right, the resource and any conditions on the validity of the license. FIG. 1 illustrates a conventional mechanism for granting rights to access a group of related resources 102a-102d. Resource 102a-102d may by way of example each be a digital work in the form of a text file, an image, an audio or video file, an e-book, or the like. Trusted issuer 104 issues a group of licenses 108a-108d to user 106. Each license 108a-108d corresponds to a different resource and potentially includes a different condition. For example, license 108a includes condition 110a and licenses 108b-108c include conditions 110b-110c. Each condition may for example be a different expiration date.

There are several drawbacks to the mechanism of granting rights in the manner shown in FIG. 1. The requirement of issuing a group of licenses that are substantially identical but differ amongst themselves according to variations within a certain structural aspect (such as variations in the resource used in each) leads to a large number of licenses that must be issued by trusted issuer 104. As the number of licenses increases, so does the burden on trusted issuer 104 and the user 106. This problem worsens as the numbers of trusted issuers, resources and users increase. Moreover, the set of variations that the group of licenses may need to cover may logically be of infinite size or otherwise be pragmatically not possible to physically enumerate or cover with conventional licenses.

Therefore, there is a need in the art for trust management languages and data structures that reduce the number of licenses that must be issued by a trusted issuer or received by a user or principal, by allowing a single license to cover plural resources and plural conditions.

SUMMARY

One or more of the above-mentioned needs in the art are satisfied by the disclosed trust management languages and data structures. One or more licenses will typically include a definition of a variable and at least one instance of at least one variable. The occurrences of the variable may be universally quantified so that the variable may be bound to any one of a set of values, with the additional constraint that each occurrence of the same variable in a license must be bound to the same value. Licenses that do not contain variables may be called ground licenses, while licenses that do contain variables may be called non-ground licenses.

The disclosed trust management languages and data structures allow a single non-ground license to have the same meaning as a plurality of ground licenses that are substantially identical but differ in some focused part or parts of each license, such as the principal, right, resource or condition therein. For example, access to a group of related resources having similar conditions may be granted by a single license. As described in detail below, the resources may be identified in the license as functions of the variable. Corresponding users, rights and conditions may also be described as functions of the variable. In at least one embodiment, licenses are represented in a computer language such as a computer language based on the eXtensible Markup Language (XML).

BRIEF DESCRIPTION OF THE DRAWINGS

Aspects of the present invention are described with respect to the accompanying figures, in which like reference numerals identify like elements, and in which:

FIG. 5 illustrates a method of generating and processing licenses that include at least two instances of a variable, in accordance with an embodiment of the invention.

DETAILED DESCRIPTION

Exemplary Operating Environment

Aspects of the present invention are suitable for use in a distributed computing system environment. In a distributed computing environment, tasks may be performed by remote computer devices that are linked through communications networks. The distributed computing environment may include client and server devices that may communicate either locally or via one or more computer networks. Embodiments of the present invention may comprise special purpose and/or general purpose computer devices that each may include standard computer hardware such as a central processing unit (CPU) or other processing means for executing computer executable instructions, computer readable media for storing executable instructions, a display or other output means for displaying or outputting information, a keyboard or other input means for inputting information, and so forth. Examples of suitable computer devices include hand-held devices, multiprocessor systems, microprocessor-based or programmable consumer electronics, networked PCs, minicomputers, mainframe computers, and the like.

The invention will be described in the general context of computer-executable instructions, such as program modules, that are executed by a processing device, including, but not limited to, a personal computer. Generally, program modules include routines, programs, objects, components, data structure definitions and instances, etc., that perform particular tasks or implement particular abstract data types. Typically the functionality of the program modules may be combined or distributed as desired in various environments.

Embodiments within the scope of the present invention also include computer readable media having executable instructions. Such computer readable media can be any available media that can be accessed by a general purpose or special purpose computer. By way of example, and not limitation, such computer readable media can comprise computer readable storage media such as RAM, ROM, EEPROM, CD-ROM or other optical disk storage, magnetic disk storage or other magnetic storage devices, or any other medium which can be used to store the desired executable instructions and which can be accessed by a general purpose or special purpose computer. Combinations of the above should also be included within the scope of computer readable media. Executable instructions comprise, for example, instructions and data which cause a general purpose computer, special purpose computer, or special purpose processing device to perform a certain function or group of functions.

Figure 1:
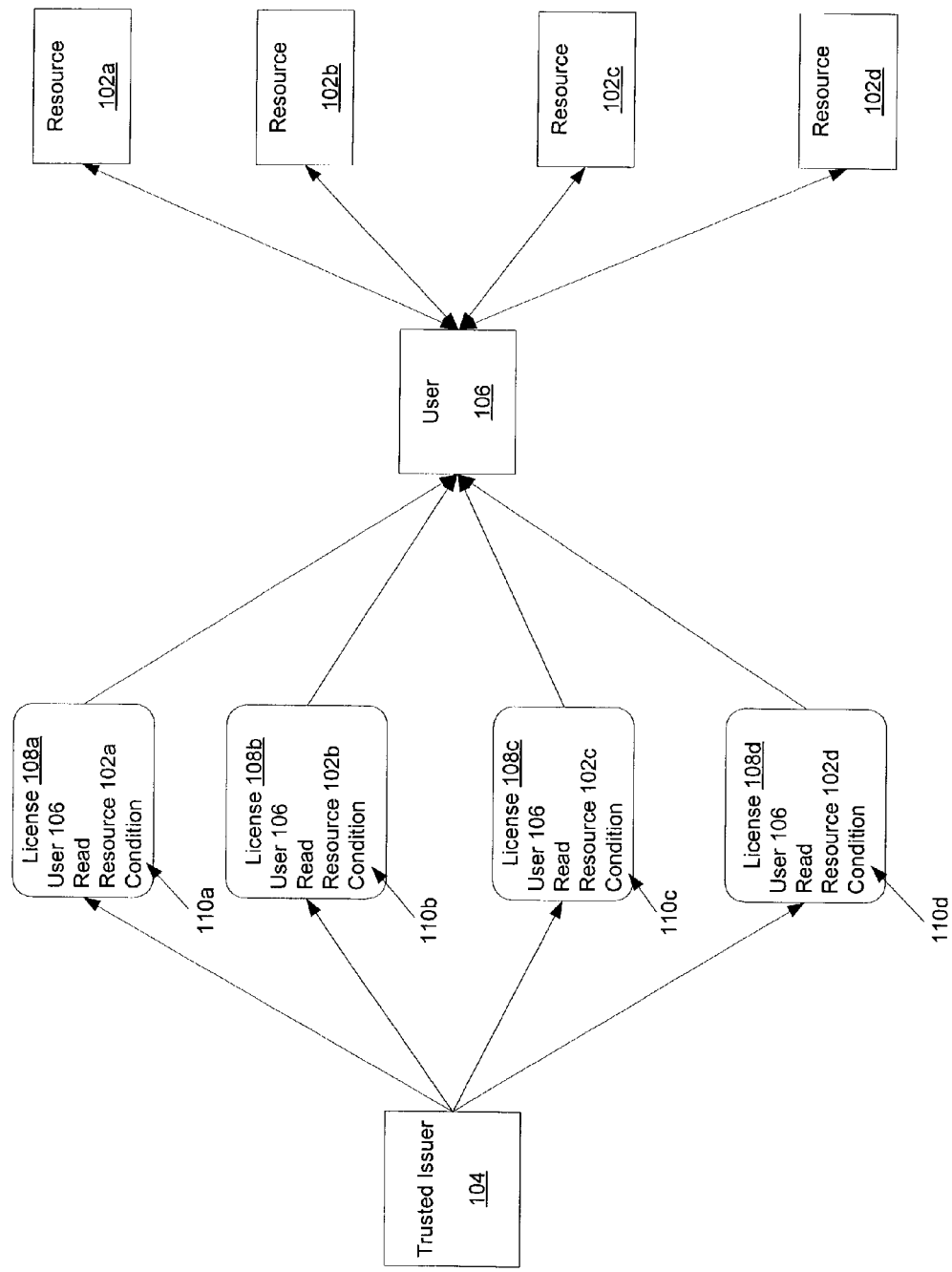
FIG. 1 illustrates a prior art mechanism for granting rights to access a resource.
Figure 2:
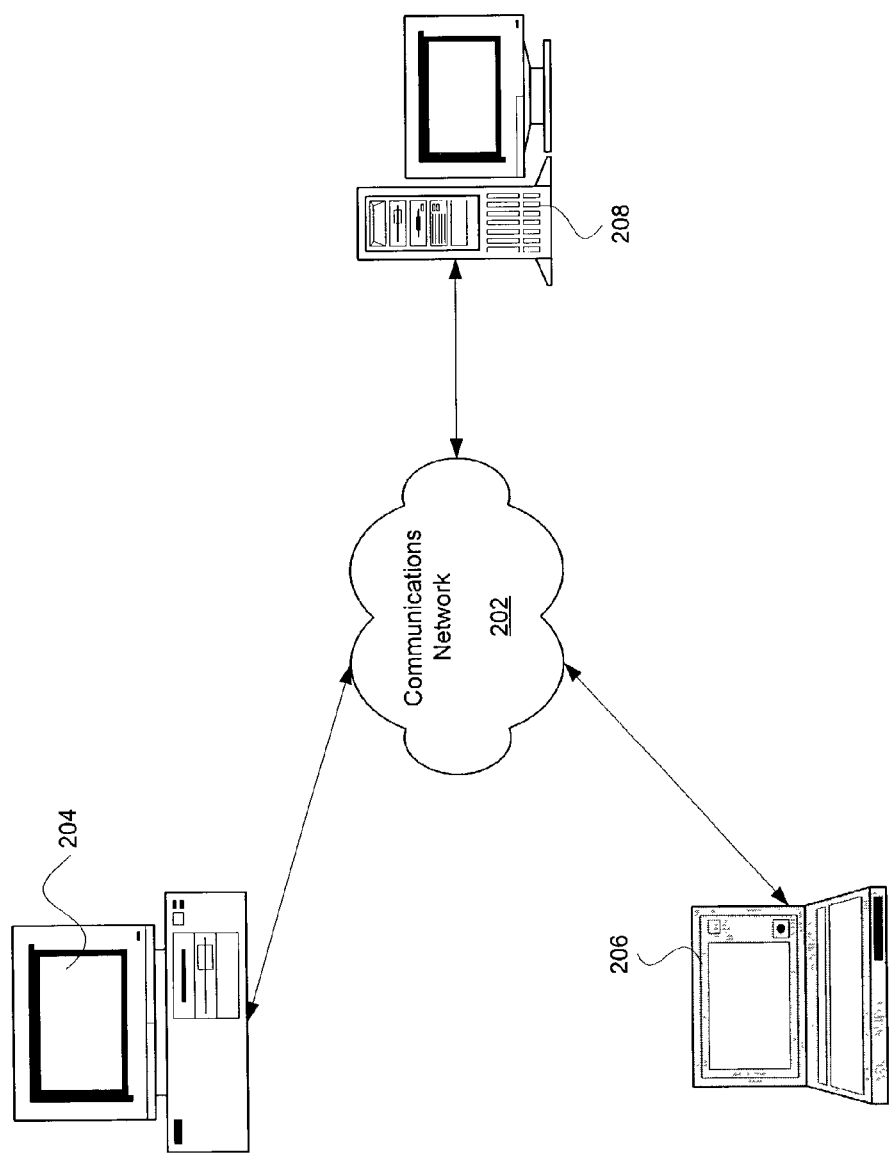
FIG. 2 shows an illustrative distributed computing system operating environment that may be used to implement aspects of the invention.

FIG. 2 illustrates an example of a suitable distributed computing system 200 operating environment in which the invention may be implemented. Distributed computing system 200 is only one example of a suitable operating environment and is not intended to suggest any limitation as to the scope of use or functionality of the invention. System 200 is shown as including a communications network 202. The specific network implementation used can be comprised of, for example, any type of local area network (LAN) and associated LAN topologies and protocols; simple point-to-point networks (such as direct modem-to-modem connection); and wide area network (WAN) implementations, including public Internets and commercial based network services such as the Microsoft Network or America Online's Network. Systems may also include more than one communication network, such as a LAN coupled to the Internet.

Computer device 204, computer device 206 and computer device 208 may be coupled to communications network 202 through communication devices. Network interfaces or adapters may be used to connect computer devices 204, 206 and 208 to a LAN. When communications network 202 includes a WAN, modems or other means for establishing communications over WANs may be utilized. Computer devices 204, 206 and 208 may communicate with one another via communication network 202 in ways that are well known in the art. The existence of any of various well-known protocols, such as TCP/IP, Ethernet, FTP, HTTP and the like, is presumed. Computer devices 204, 206 and 208 may exchange content, applications, messages and other objects via communications network 202.

Description of Illustrative Embodiments

Figure 3:
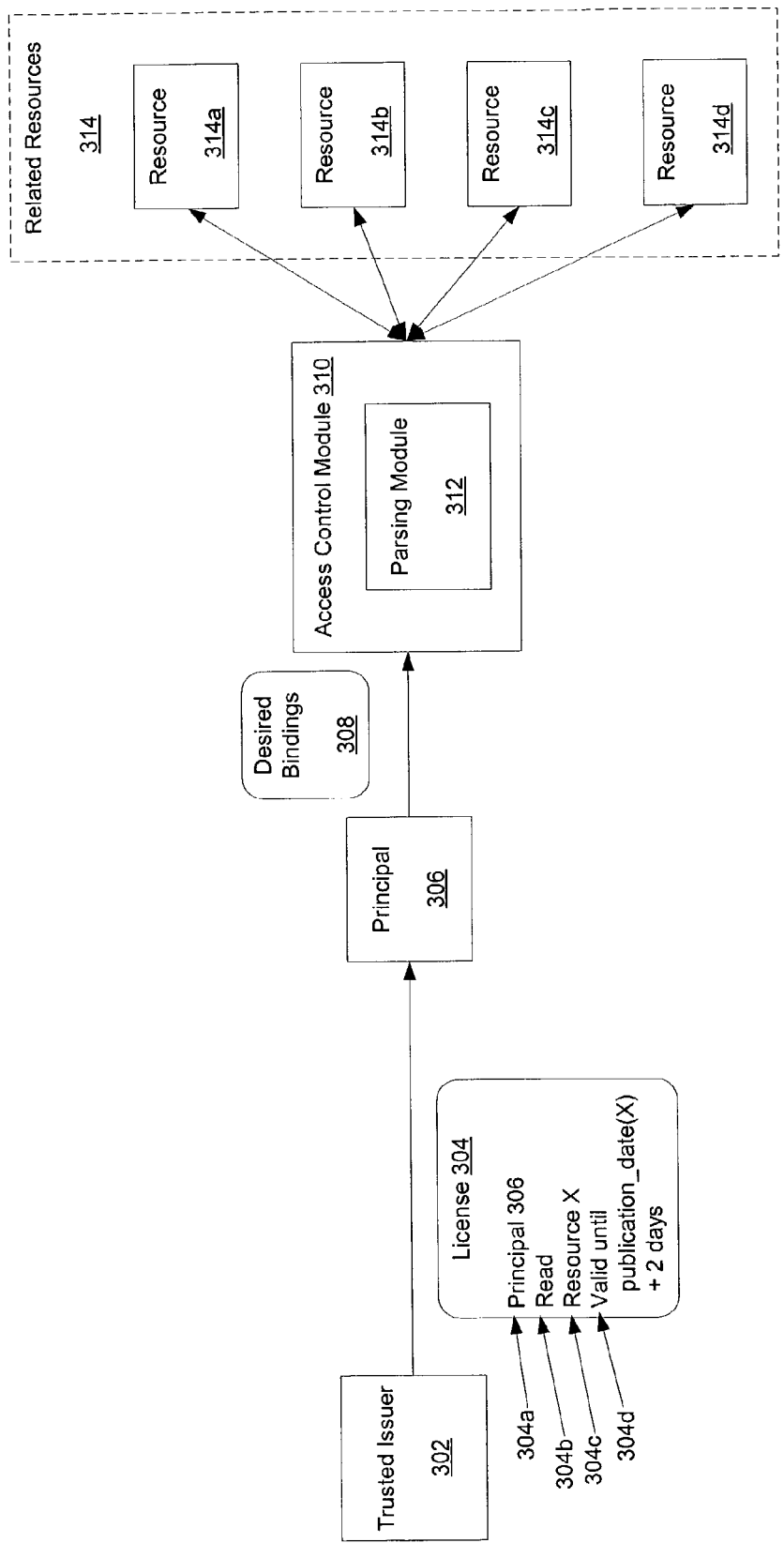
FIG. 3 illustrates a mechanism for granting rights to resources and that includes two instances of a variable, in accordance with an embodiment of the invention.

FIG. 3 illustrates a mechanism for granting rights to resources in accordance with an embodiment of the invention. FIG. 3 shows an embodiment of the invention in which a trusted issuer 302 issues a license 304 to a principal 306. In one embodiment, license 304 is created with a trust management language that is a derivation of XML, such as the extensible rights markup language (XrML). In another embodiment, license 304 is created with an object-oriented programming language.

License 304 includes a field 304a for identifying principal 306, a field 304b for identifying a right (here "read"), a field 304c for identifying a resource (here "X") with a variable and field 304d for identifying a condition (here "publication_date (X)+2 days"). Field 304d includes an instance of the variable X first identified in field 304c. In one embodiment of the invention, the variable X represents a resource, and the function publication_date(X) represents the resource's publication date. For example, each one of a group of related resources 314 may have an associated publication date. License 304 allows principal 306 to read any resource for which the issuer is trusted, such as resources 314a-314d, subject to the additional condition that this particular license is no longer valid for any given resource two days after the publication date of that resource. Such a license may be interpreted as letting the principal 306 read any of the resources that the issuer controls, but only for the first two days after the resource's publication date.

Principal 306 may exercise the "read" right 304b included in license 304 by first transmitting license 304 and a list of desired bindings 308 to an access control module 310. Of course, when only a single variable is used in a license, the corresponding list of desired bindings may include only a single element. The list of desired bindings 308 may identify the particular one of the related resources 314 principal 306 desires to read, such as by stating that the variable X is to be bound to resource 314c. Access control module 310 may be a software or hardware module, residing locally or remotely to corresponding resources 314a-314b and may be used to control access to resources 314a-314b in the manner described below on behalf of principal 306. Access control module 310 may include a parsing module 312 to parse and interpret licenses. In one particular embodiment of the invention that uses licenses formatted in accordance with XrML schemas, parsing module 312 parses through an XrML document to obtain license data.

Interpreting an appropriate trust management language may require access control module 310 and/or parsing module to consistently assign the values in the list of desired bindings 308 to the associated variables. Each instance of the variable is bound to the same value. For example, after principal 306 names a certain resource in the list of desired bindings 308, the condition in field 304d becomes a function of that resource's publication date.

FIG. 3 shows an embodiment in which a single access control module 310 is coupled to resources 314a-314d for principal 306. In alternative embodiments, one or more resources 314a-314d may be coupled to additional access control modules and/or parsing modules. Moreover, a single license may include several instances of a variable that has been defined and/or any number of variables. The definition of a variable may be implicit or explicit. An explicit definition may be in the form of "for all X."

Figure 4:
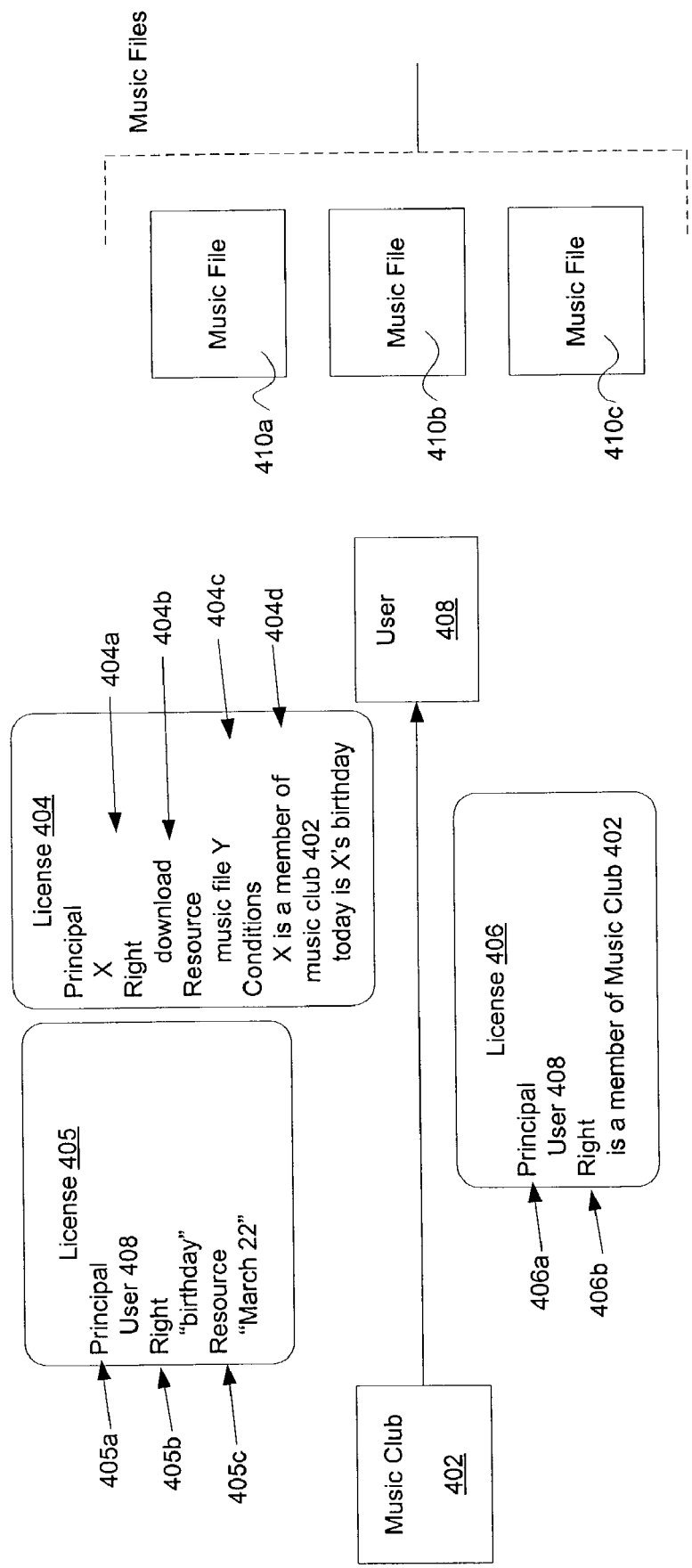
FIG. 4 illustrates a system in which a music club distributes three related licenses to a user, in accordance with an embodiment of the invention.

The present invention is not limited to embodiments that operate within a single license. FIG. 4, for example, illustrates an illustrative system in which a music club 402 distributes three licenses 404-406 to a user 408. With the configuration shown, music club 402 desires to allow any particular member to download any song on his or her birthday. His or her membership and birthday are certified by music club 402, each in its own license.

License 404 allows certain users to download certain songs, as defined by the specified conditions. The principal field 404a contains the variable "X," identifying any principal, subject to the specified conditions. The right to download is identified in a right field 404b. Resource field 404c identifies music files with an additional variable "Y," specifying any music file, subject to the specified conditions. Conditions are included within a condition field 404d. License 404 includes two conditions. First, the user, denoted by "X", must be a member of the music club 402. Second, the license 404 may be exercised only on the user's birthday. These conditions constrain possible values of X. Because no conditions constrain possible values of Y, any music file may be downloaded.

License 405 certifies that user 408 has a birthday on March 22. User 408 is identified in a principal field 405a. The "birthday" right is identified in a right field 405b. The date "March 22" is identified in a resource field 405c. No conditions are included in license 405.

License 406 certifies that user 408 is a member of the music club. User 408 is identified in a principal field 406a. A right field 406b indicates that the user is a member of music club 402. The resource field identifies the music club. No conditions are included in license 406.

In the exemplary embodiment shown, a list of desired bindings is generated when user 408 selects a particular music file. For example, if user 408 selects music file 410b, variable "X" in the list of desired bindings will be associated with a value of "user 408" and variable "Y" will be associated with a value of "music file 410b." Variable "X" is then bound to "user 408" and variable "Y" is bound to "music file 410b" in a copy of license 404, and the resulting license is checked for validity. Because both conditions in the resulting license are met, the resulting license is valid, and user 408 is granted the right to exercise it. One skilled in the art will appreciate the number of scenarios that non-ground license 404 may cover along with appropriate prerequisite licenses such as 405 and 406. In contrast, prior art mechanisms would require numerous ground licenses to be individually issued to individual users to achieve the same functionality.

FIG. 5 illustrates a method of granting rights to a resource in accordance with an embodiment of the invention. First, in step 502, a trusted issuer generates a license that includes principal, right and resource fields formatted in accordance with the rules of a trust management language. The trust management language may identify the fields to be included within a license and how the fields are to be interpreted. Next, in step 504 a definition and one or more instances of a variable are included in the fields of the license. The license may include any number of instances of additional variables that have been implicitly or explicitly defined. In one embodiment, each variable is explicitly universally quantified so that the variable can take any value of a given set of values. For example, the variable may be introduced with the expression "for any value of" or defined as being any value of a definite set. Next, the license is received by a principal in step 506.

The principal may then transmit the license along with a list of desired bindings to a resource or access control module in step 508. The resource or access control module may then assign the desired value to each variable in step 510 to a copy of the license. Finally, in step 512 the resource or access control module checks the resulting license for validity, and grants the specified right if the specified conditions are met.

Further, embodiments of the invention may be implemented in hardware, software, or by an application specific integrated circuit (ASIC). The firmware may be in a read-only memory and the software may reside on a medium including, but not limited to, read-only memory, random access memory, floppy disk or compact disc.

The present invention has been described in terms of preferred and exemplary embodiments thereof. Numerous other embodiments, modifications and variations within the scope and spirit of the appended claims will occur to persons of ordinary skill in the art from a review of this disclosure.

We claim:

1. A computer-implemented method for processing a digital rights license received from a trusted entity to grant a principal computer device rights to a resource, the digital rights license including at least a right field, the computer-implemented method comprising:

the principal computer device receiving the digital rights license, wherein the digital rights license includes at least one variable, wherein the at least one variable is defined within the digital rights license and at least one instance of each of the at least one variable is present within the license, wherein a first instance of a first of the at least one variable is universally quantified so that the variable can be bound to any one of a set of resources;

the principal computer device generating a list of desired bindings for the first of the at least one variable to two or more resources of the set of resources;

the principal computer device transmitting the digital rights license along with the list of desired bindings to a resource or access control module; and the resource or access control module generating a copy of the digital rights license for each of the two or more resources specified in the list;

for each copy of the digital rights license, binding the first of the at least one variable contained in the copy of the digital rights license to a corresponding one of the two or more resources specified in the list of desired bindings such that each instance of the first of the at least one variable in the copy of the digital license is bound to the corresponding resource; and the resource or access control module validating each copy of the digital rights license to authorize the principal computer device to access the corresponding resource as specified by the first of the at least one variable.

2. The computer-implemented method of claim 1, wherein two instances of the first of the at least one variable are present within the digital rights license and wherein the first instance is in a resource field and the second instance is in a condition field.

3. The computer-implemented method of claim 2, further including:

using a computed date value as an expiration date.

4. The computer-implemented method of claim 1 wherein the digital rights license is created with a usage rights language that is a derivation of XML.

5. The computer-implemented method of claim 1, wherein the digital rights license is created with an object oriented programming language.

6. The computer-implemented method of claim 1, wherein the definition of the first of the at least one variable is an implicit definition.

7. A computer-readable storage media having stored thereon computer-executable instructions for causing a computer device to implement a method for processing a digital rights license received from a trusted entity to grant a principal computer device rights to a resource, the digital rights license including at least a right field, the computer-executable instructions performing a method comprising:

the principal computer device receiving the digital rights license, wherein the digital rights license includes at least one variable, wherein the at least one variable is defined within the digital rights license and at least one instance of each of the at least one variable is present within the license, wherein a first instance of a first of the at least one variable is universally quantified so that the variable can be bound to any one of a set of resources;

the principal computer device generating a list of desired bindings for the first of the at least one variable to two or more resources of the set of resources;

the principal computer device transmitting the digital rights license along with the list of desired bindings to a resource or access control module; and the resource or access control module generating a copy of the digital rights license for each of the two or more resources specified in the list;

for each copy of the digital rights license, binding the first of the at least one variable contained in the copy of the digital rights license to a corresponding one of the two or more resources specified in the list of desired bindings such that each instance of the first of the at least one variable in the copy of the digital license is bound to the corresponding resource; and the resource or access control module validating each copy of the digital rights license to authorize the principal computer device to access the corresponding resource as specified by the first of the at least one variable.

* * * * *